J. A. BAILEY.
WATER GRASS SEED TRAP.
APPLICATION FILED DEC. 18, 1918.
1,300,913.
Patented Apr. 15, 1919.
2 SHEETS—SHEET 1.
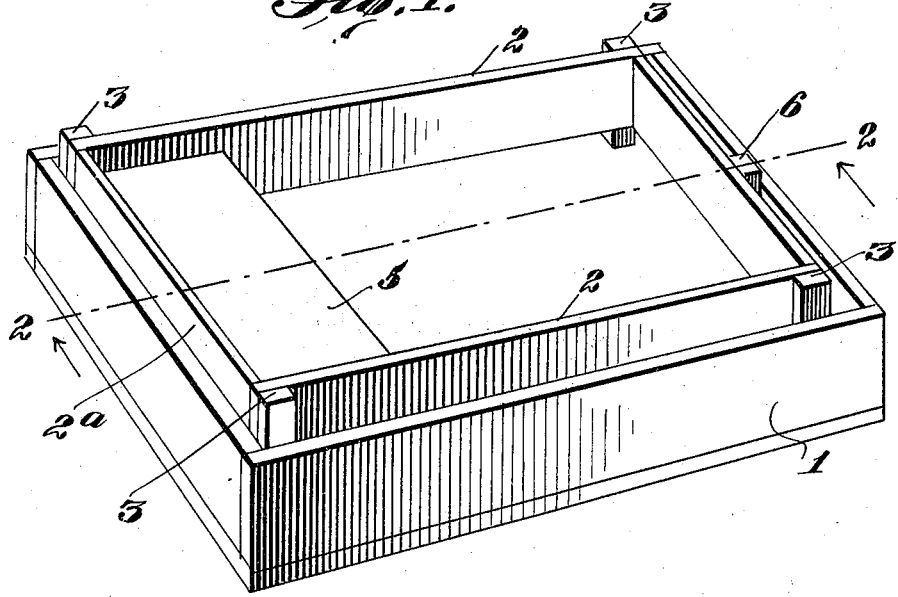
Fig. 1.
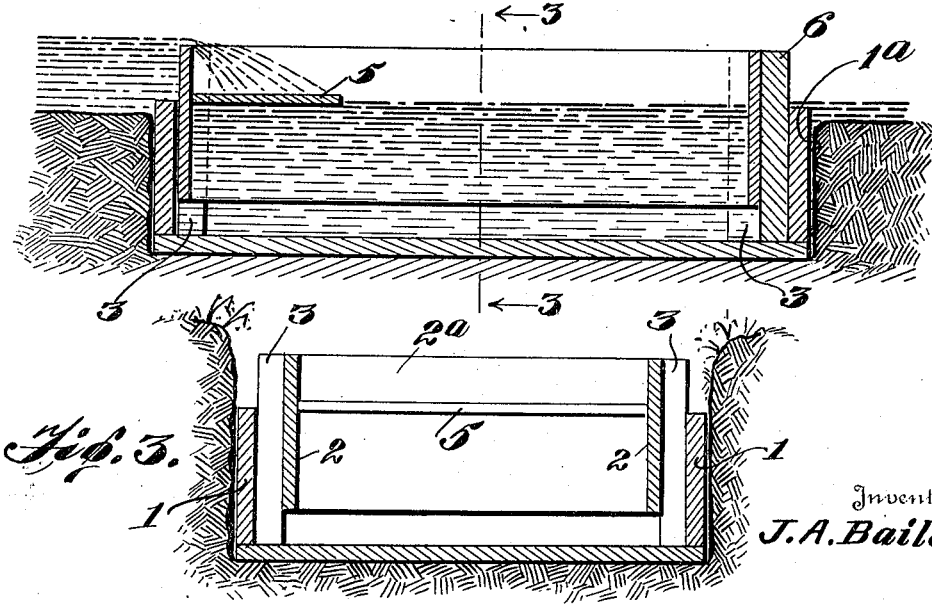
Fig. 2.
Fig. 3.
Inventor
J. A. Bailey.
By
his Attorneys J. A. BAILEY.
WATER GRASS SEED TRAP.
APPLICATION FILED DEC. 18, 1918.
1,300,913.
Patented Apr. 15, 1919.
2 SHEETS—SHEET 2.
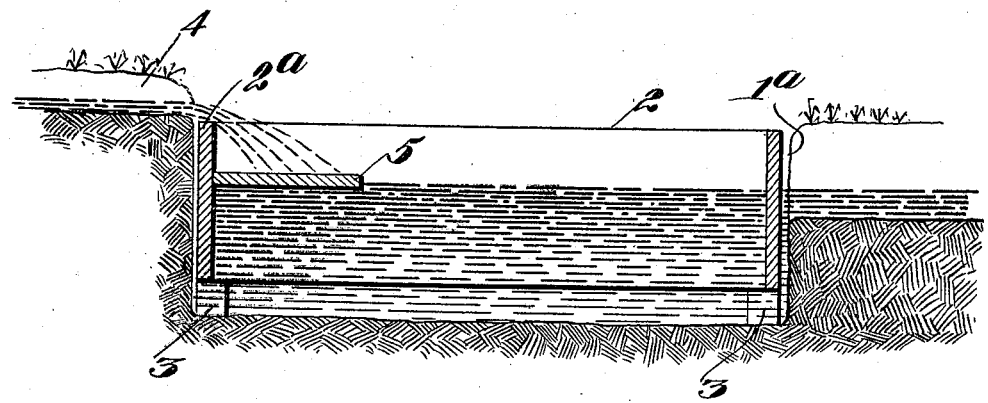
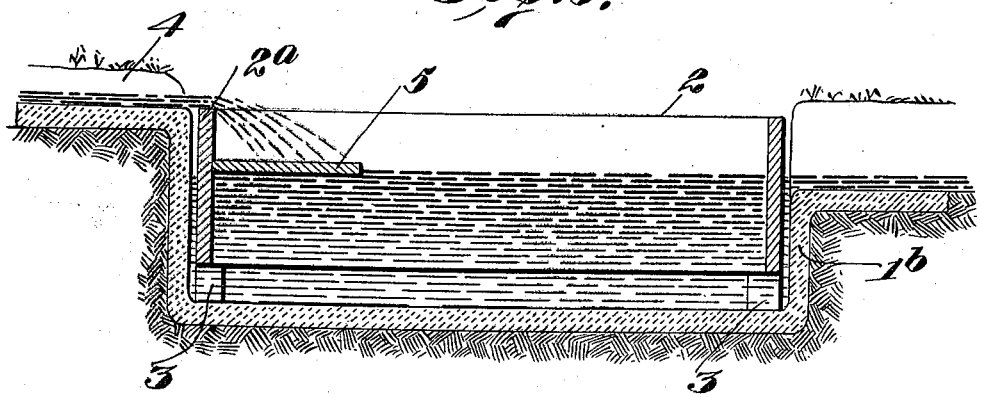
Inventor
J. A. Bailey.

UNITED STATES PATENT OFFICE.

JOHN AMITY BAILEY, OF WILLOWS, CALIFORNIA.

WATER-GRASS-SEED TRAP.

1,300,913.   Specification of Letters Patent.   Patented Apr. 15, 1919.

Application filed December 18, 1918. Serial No. 267,383.

*To all whom it may concern:*

Be it known that I, JOHN A. BAILEY, a citizen of the United States of America, residing at Willows, in the county of Glenn and State of California, have invented certain new and useful Improvements in Water-Grass-Seed Traps, of which the following is a specification, reference being had therein to the accompanying drawings.

This invention relates to a water grass seed trap and has for its object the construction of a simple and efficient trap that will collect the water grass seed and make it practical for the operator to easily gather up and sack the seed at his leisure.

With this and other objects in view the invention consists of certain constructions and modifications, as will be fully described in the following specification and more particularly pointed out in the accompanying claims.

In the drawings:

Figure 1 is a perspective view of the preferred form of my device, while

Fig. 2 is a longitudinal, sectional view taken on line 2—2 Fig. 1, and looking in the direction of the arrows.

Fig. 3 is a sectional view taken on line 3—3, Fig. 2, looking in the direction of the arrows.

Fig. 4 is a vertical sectional view of another embodiment of the present invention, while Fig. 5 is a still another embodiment, shown in section, of the present invention.

Referring to the drawings by numerals, 1 designates the outer or primary casing or container, which in the embodiment shown in Fig. 4 is constituted by a hole or pocket $1^a$ cut in the ground, whereas in the embodiment shown in Fig. 5 the outer casing or container in this embodiment is of a cement structure $1^b$. The general structure of the container 1 or $1^a$ or $1^b$ is preferably oblong, and within the primary container is positioned the auxiliary container or frame 2.

This auxiliary container comprises vertical posts or standards 3, positioned at the corners and these posts or standards are of a greater height than the sides and ends of the auxiliary container, being projected below the sides and ends, as clearly shown in Figs. 2 to 5, so as to allow the water to pass under the sides and ends of the auxiliary container and rise up and pass over the upper edges of the primary container.

It is desirable to have the end $2^a$ of the auxiliary container positioned close to the discharge end 4 of the ditch, which discharge end permits the water to flow over end $2^a$ of the auxiliary container and drop upon the horizontal receiving board 5 at end $2^a$, to break the flow of the water entering the auxiliary container.

To securely hold the end $2^a$ contiguous to or against the entrance end of the primary container, I place an intermediate post or standard 6 contiguous to the discharge end of the primary container 1 so as to hold the auxiliary container in its operative position.

The operation of the device is as follows:

I place the primary container 1 in a suitable pocket or hole cut down in the irrigating ditch, or if the ground is hard enough I make the primary container by cutting a satisfactory receiving pocket or container in the ditch (Fig. 4) and then place the auxiliary container in the primary container as shown in Figs. 1 and 4. If I desire I can make the primary container out of cement as shown in Fig. 5, the operation of the device being just as satisfactory in either instance.

The water enters the auxiliary container flowing upon the horizontal receiving board 5, that breaks the flow of the water and especially prevents injury to the primary container if it is made out of earth, as shown in Fig. 4; the water grass seed collects in the primary container, as the auxiliary container has its upper edges projecting higher than the primary container, allowing of the water to flow in the lower edges of the auxiliary container and pass over the upper edges of the primary container as shown in Figs. 2, 4 and 5. The operator can gather the seed in the auxiliary container and sack the same at his leisure.

What I claim is:

1. In a device of the class described the combination with a primary container, of an auxiliary container within the primary container, said auxiliary container comprising sides and ends, means holding the sides and ends spaced above the bottom of the primary container, and a receiving means in said auxiliary container and at one end thereof.

2. In a device of the class described the combination with a primary container, of an auxiliary container in said primary container, horizontal receiving means contiguous to one end of and in said auxiliary container, and means holding the auxiliary container spaced from the bottom of the primary container.

3. In a device of the class described the combination with a primary container having sides and ends, of an auxiliary container within said primary container and having its sides and ends extending above the sides and ends of the primary container, and means in the auxiliary container for breaking the flow of water running into the auxiliary container over one end of the primary and auxiliary containers.

4. In a device of the class described the combination with a primary container comprising a bottom, sides and ends, of an auxiliary container in said primary container, said auxiliary container comprising sides and ends, posts secured to the corners of said auxiliary container and having their lower ends projecting below the lower ends of the sides and ends of the auxiliary container, the lower ends of the posts resting upon the bottom of the primary container, one end of the auxiliary container resting against one end of the primary container and the other end of the auxiliary container being spaced from the other end of the primary container, means at the middle of the spaced ends of the containers holding the auxiliary container in position, the upper edges of the sides and ends of the auxiliary container positioned above the upper edges of the primary container, and a horizontal receiving board secured in the auxiliary container against the end that abuts against the end of the primary container.

In testimony whereof I hereunto affix my signature.

JOHN AMITY BAILEY.

Copies of this patent may be obtained for five cents each, by addressing the "Commissioner of Patents, Washington, D. C."